United States Patent Office 2,876,856
Patented Mar. 10, 1959

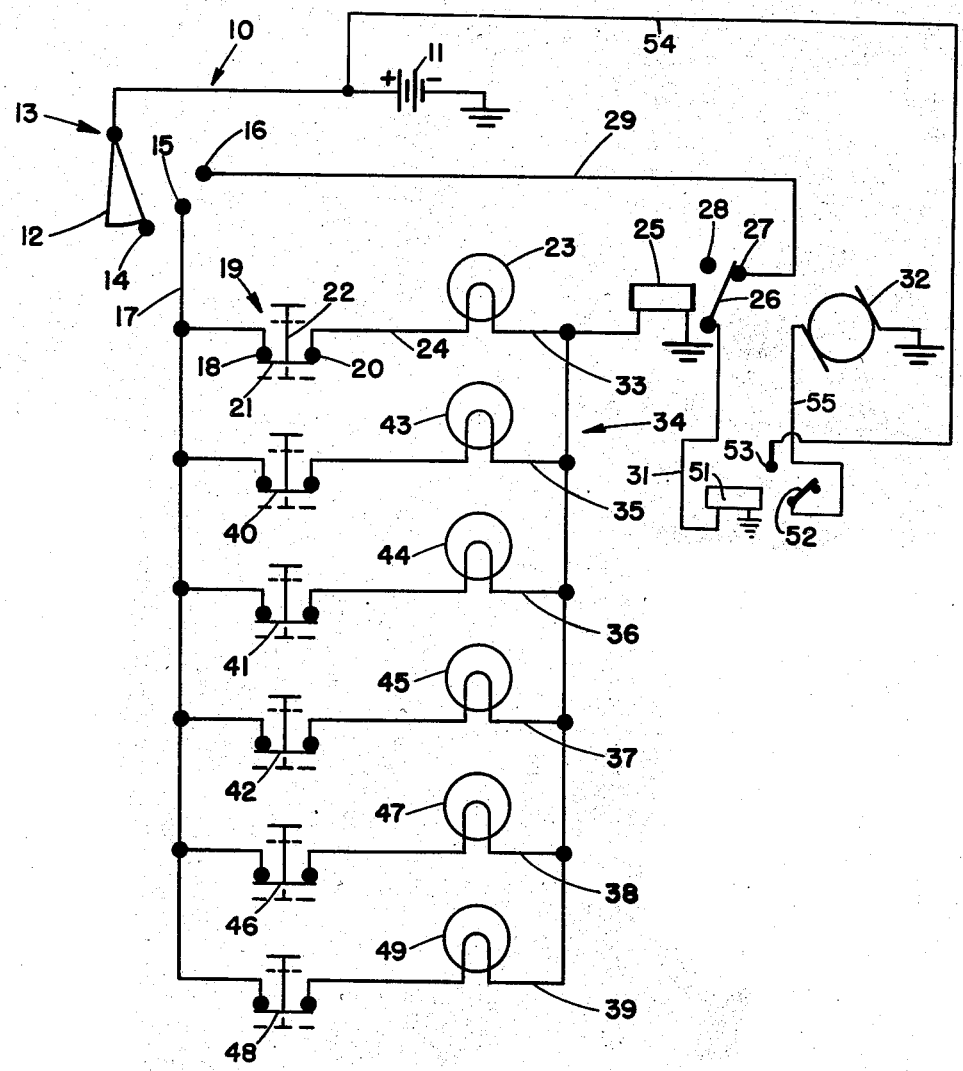

2,876,856

VEHICLE DOOR-CLOSED SAFETY SYSTEM

Sidney R. Greene, New Haven, Conn.

Application September 1, 1954, Serial No. 453,518

6 Claims. (Cl. 180—82)

This invention relates to indicating and safety systems and more particularly to novel means for indicating whether an automobile is in condition for safe operation and for preventing operation of the automobile until the latter is in such condition.

Accidents have occurred in the operation of automobiles by reason of improperly or loosely closed doors which open when the automobile is traveling and thereby cause injury to persons and property. Automobiles, at present, employ a primary latching device for holding a door safely and securely shut and a secondary latching device for initially holding the door in loosely closed position. Most accidents occur when the doors are in the loosely closed positions because vibration of the automobile and/or slight pressure against the door, as for example, by a passenger leaning against the door, causes the door to open. A hazardous condition also results in the case of an improperly closed hood which opens under high speed of travel to obscure the vision of the driver.

The present invention contemplates a novel system for indicating open and/or improperly closed positions of the doors, hood and trunk door of automobiles and for preventing operation of the latter until it is in condition for safe operation.

In accordance with the present invention, the subject system contemplates novel means arranged in the battery starter motor circuit of an automobile for indicating a condition of improperly closed or open doors, hood and trunk door when the ignition switch is in an "on" position, and for preventing energization of the starter motor by the battery when the ignition switch means is moved to a "start" position and such condition is present. The aforementioned means includes normally closed make-break switches which cause actuation of relay means to prevent energization of the starter motor when the doors and hood are improperly closed or open.

The above and other objects and advantages of the present invention will appear more fully hereinafter from a detail description which follows, taken together with the accompanying drawing wherein the single figure schematically illustrates one embodiment of the invention.

In the drawing, the numeral 10 indicates an indicating and safety system for automobiles having a conventional storage battery 11 with the negative side connected to ground. The positive side of battery 11 is connected to a rotatable sector-shaped conducting member 12 of ignition switch means 13 as, for example, the conventional type key operated ignition switch, which further includes contacts 14, 15 and 16 engageable by the sector-shaped member 12 and which contacts correspond to the "off," "on" and "start" positions, respectively, of ignition switch means 13. Ignition switch means 13 is constructed and arranged so that when member 12 is moved to the start position it engages both contacts 15 and 16. Contact 15 is connected by a conductor 17 to a contact 18 of a simple make-break and normally closed spring urged plunger type switch, shown schematically in the drawing. Switch 19 includes a second contact 20 and a movable conducting plate 21 which is adapted to bridge contacts 18 and 20 and is secured to a plunger 22 normally urged by a spring (not shown) to bring plate 21 into contact with contacts 18 and 20. Switch 19 is adapted for mounting adjacent the lock position of a door (not shown) of an automobile (not shown), and plunger 22 is engageable by the door so as to be displaced against the action of the spring (not shown) to the dotted line position shown in the drawing when the door is tightly shut. When the door is open or improperly closed, plunger 22 is maintained by the spring (not shown) in a position wherein contact plate 21 engages contacts 18 and 20 of switch 19, as shown by the full line position of the plunger and the plate in the drawing.

An indicator as, for example, a lamp 23 is connected in series with switch 19 and contact 20 by a conductor 24. Lamp 23 may be preferably mounted on the instrument board in front of the driver and may be provided with a colored lens engraved with a legend designating one door, as for example, "Front right." Lamp 23 is also connected to one side of a winding (not shown) of a relay 25, which winding has its other side connected to ground. Relay 25 includes a spring urged pivotal contact arm 26 which is movable into engagement with contacts 27 and 28 of the relay. It is to be understood that energization of the relay winding attracts and causes the contact arm to be pivoted into engagement with contact 28 while de-energization of the relay winding permits the spring (not shown) to pivot contact arm 26 into engagement with contact 27. Contact 27 is connected by a conductor 29 to contact 16 of ignition switch means 13 while contact 28 is not connected in the circuit. The pivotal end of contact arm 26 is connected by a conductor 31 to one side of a winding of a relay 51, which winding has the other side connected to ground. Relay 51 includes a spring urged pivotal contact arm 52 which is movable into engagement with a contact 53 upon energization of the relay, and contact 53 is connected to the positive side of battery 11 by a lead 54. The pivotal end of contact arm 52 is connected by a conductor 55 to a winding (not shown) of a starter motor 32 which is also connected to ground. Starter motor 32 is connected by means (not shown) to initially operate an internal combustion engine (not shown) upon energization thereof.

Make-break switch 19 and lamp 23 constitute a branch 33 of a network generally designated by the numeral 34 which is connected in series with switch ignition means 13 and relay 25. Network 34 includes branches 35, 36, 37, 38 and 39 which are connected in parallel with each other and with branch 33. Each of the last-mentioned branches includes a make-break switch and a lamp identical to switch 19 and lamp 23, respectively. Switches 40, 41 and 42 are provided in branches 35, 36 and 37, respectively, and are adapted for mounting adjacent the lock side of the remaining doors (not shown) of the automobile (not shown) and are arranged for actuation by the doors. Lamps 43, 44 and 45 are associated with switches 40, 41 and 42, respectively, and operate in the same manner as lamp 23. Lamps 43, 44 and 45 may each be provided with a colored lens bearing a legend designating the door with which it is associated. Switch 46 and a lamp 47 are arranged in branch 38. Switch 46 is adapted for mounting adjacent the hood (not shown) and is actuated to a break position by the hood when the latter is properly closed and by the spring (not shown) to a make position when the hood is improperly closed or open. Switch 48 and a lamp 49 are arranged in branch 39. Switch 48 is adapted for mounting adjacent the lock position of a trunk door (not shown) and is actuated to a break position when the trunk door is properly closed and by the spring (not shown) to a make position when the door is improperly closed. The lamps 47 and 49 may also be provided with colored lenses bearing legends engraved "Hood" and "Trunk," respectively.

All of the lamps may be arranged together on the instrument panel in front of the driver so as to be readily visible to the latter.

In operation, when switch means 13 is in an "off" position and all four doors, hood and trunk door are properly closed, switches 19, 40 to 42, 46 and 48 are displaced against the force of the springs (not shown) to break position. Relay 25 is de-energized and contact member 26 is in engagement with contact 27 of the relay. Sector-shaped member 12 is then rotated by a key (not shown) from "off" position to "on" position whereby member 12 engages contacts 14 and 15. In this position of member 12, lamps 23, 43 to 45, 47 and 49 do not glow because the associated make-break switches are in break position, and the driver is informed that the automobile is in proper condition for operation. Member 12 is then rotated to the "start" position for starting the engine (not shown) wherein the member engages contacts 15 and 16 to cause energization of relay 51 through the following circuit: From the positive side of battery 11 to sector member 12, contact 16, conductor 29, contact 27 and contact arm 26, conductor 31, winding of relay 51 to ground to cause energization of the relay and movement of contact arm 52 into engagement with contact 53. Starter motor 32 is then energized through the following circuit: the positive side of battery 11, conductor 54, contact 53, contact arm 52, conductor 55, winding of starter motor 32 then to ground.

As pointed out hereinbefore, the present invention provides a safety and indicating system when one or more of the doors, or hood and/or trunk door are improperly closed or opened to prevent operation of the automobile. If, for example, the door associated with switch 19 is improperly closed or open, switch 19 is maintained by the spring (not shown) in a make position wherein plate 21 engages contacts 18 and 20. Thus, when sector member 12 is turned to the "on" position, it engages contacts 14 and 15 to cause energization of relay 25 and lamp 23 through the following circuit: From the positive side of battery 11 to sector member 12, contact 15, conductor 17, contact 18, plate 21, contact 20, conductor 24, lamp 23, winding of relay 25, thence to ground. When relay 25 is energized contact arm 26 is attracted toward the relay and is disengaged from contact 27 to engage contact 28. Consequently, when sector member 12 is moved to the "start" position to engage contact 16 energization of relay 51 and of starter motor 32 are prevented; it being understood that the relay winding of relay 25 remains energized by reason of sector member 12 also engaging contact 15, whereby contact arm 26 is maintained in engagement with contact 28 while ignition switch means 13 is moved from the "on" position to the "start" position. If the driver, for some reason, fails to notice the glow of lamp 23 when the sector member 12 is moved to an "on" position, and continues to move the sector member to the "start" position there is no danger of operating the automobile under such dangerous condition because the automobile will not operate until the improperly closed or open door is properly closed. Similarly, if any of the other doors or hood or trunk doors are improperly closed the associated switches will operate in identical manner to cause energization of relay 25 and deenergization of relay 51 to prevent operation of starter motor 32.

It is to be understood that reference to the doors, hood and trunk door as being open in the claims is also to be construed as covering the improperly closed positions of such members.

It will now be apparent that the present invention provides a novel indicating and safety system for automobiles whereby operation of the same is prevented until it is in proper condition for operation. By arranging the make-break switches and relays as disclosed to control operation of the starter motor only and not the engine, operation of the engine, once started, does not have to be discontinued if it is desired to open any of the doors, hood and trunk door while the engine is in operation.

Inasmuch as various changes may be made in the particular form, location, and arrangement of parts of the apparatus disclosed without departing from the principles of the invention, it will be understood that the invention should not be limited excepting by the scope of the appended claims.

What is claimed is:

1. In an indicating and safety system for automobiles having at least one door and a circuit comprising ignition switch means, a battery and a starter motor, the ignition switch means being movable to three positions, an "off" position, an "on" position, and a "start" position, said ignition switch means in the "start" position connecting the battery to the starter motor to cause energization of the latter, relay means in circuit with said battery and said starter motor and energizable when the ignition switch means is in the "start" position, said relay means when energized connecting said starter motor with said battery and when deenergized disconnecting the battery from said starter motor, the improvement comprising second relay means in circuit with the first mentioned relay means and preventing energization of the latter when said second relay means is energized, and permitting energization of said first relay means when said second relay means is deenergized, switch means adapted to be actuated by the door, said switch means being operable when the ignition switch means is in an "on" position and the door is open for energizing said second relay means, and when the door is closed for causing deenergization of said second relay means, and indicating means in circuit with said switch means for indicating the open position of the door when the ignition switch means is in the "on" position.

2. In a safety system for automobiles having at least one door and a circuit comprising ignition switch means, a battery having one terminal connected to ground, and a starter motor having a winding with one side connected to ground, the ignition switch means being movable to three positions, an "off" position, an "on" position and a "start" position, said ignition switch means comprising a contact for each position and a movable switch member connected to the other terminal of the battery and adapted to engage each of said contacts, said switch member causing energization of the starter motor by the battery when engaging the "start" position contact, a relay having a winding with one end connected to ground, said relay having a movable contact arm connected to the other side of the starter motor winding and connected to said other terminal of the battery upon energization of said relay winding, the improvement comprising a branch circuit including a make-break switch responsive to the position of a door and maintained in a make position when the door is open and actuated to a break position when the door is closed, a second relay having a winding connected at one side to the switch in said branch circuit and its other side connected to ground, said second relay having a contact connected to the "start" contact of the ignition switch means, said second relay further having a movable contact arm connected to the other end of said first relay winding and in engagement with the contact of said second relay for energizing the first relay winding upon deenergization of the second relay winding and said switch members in the "on" position, said second relay winding being energized when the switch member is in the "on" position and the make-break switch is in a make position to disengage the second mentioned contact arm from the contact of said second relay to thereby deenergize the first relay winding whereby when the ignition switch member is moved into the "start" position energization of the starter motor is prevented.

3. In a safety system for automobiles having a plurality of doors, a hood and a trunk door, and a circuit comprising ignition switch means, a battery having one terminal connected to ground, and a starter motor having a winding with one side connected to ground, the ignition switch means being movable to three positions, an "off" position, an "on" position, and a "start" position, said ignition switch means comprising a contact for each position and a rotatable switch member connected to the other terminal of the battery and adapted to engage each of said contacts, said switch member causing energization of the starter motor by the battery when engaging the start position contact, a relay having a winding with one end connected to ground, said relay having a movable contact arm connected to the other side of the starter motor winding and connected to said other terminal of the battery upon energization of said relay winding, the improvement comprising a second relay having a winding with one side in circuit with the "on" contact of the ignition switch means and the other side connected to ground, said second relay including a contact connected to the "start" contact of the ignition switch means, said second relay further having a movable contact arm connected to the other end of said first relay winding and in engagement with the contact of said second relay for energizing the first relay winding upon deenergization of the second relay winding and said switch members in the "on" position, said second relay winding being energized when the switch member is in the "on" position and the make-break switch is in a make position to disengage the second mentioned contact arm from the contact of said second relay to thereby deenergize the first relay winding whereby when the ignition switch member is moved into the "start" position energization of the starter motor is prevented, a network connected in series with the "on" contact of said ignition switch means and with said second relay winding and comprising a plurality of branches connected in parallel with each other, said network having an individual branch for each door, hood and trunk door, and a make-break switch arranged in each branch of the network and in a make position when its associated door, hood and trunk door is open and when the ignition switch means is in an "on" position to connect the second relay winding to the battery for energization to cause the second relay contact arm to be disengaged from the contact of said second relay to deenergize the first relay winding whereby energization of the starter motor is prevented when the ignition switch member is moved into engagement with the "start" contact.

4. The system of claim 2 wherein an indicating lamp is connected in the branch circuit between the make-break switch and the second relay and is energized when the switch is in a make position with the movable ignition switch member engaging the "on" contact.

5. The system of claim 3 wherein a lamp is connected in each branch of a network to indicate when the associated make-break switch is in a make position.

6. In a safety system for automobiles having at least one door and a circuit comprising ignition switch means, a battery and a starter motor, the ignition switch means being movable to three positions, an "off" position, an "on" position and a "start" position, said ignition switch means in the "start" position connecting the battery to the starter motor to cause energization of the latter, relay means in circuit with said battery and said starter motor and energizable when the ignition switch means is in the "start" position, said relay means when energized connecting said starter motor with said battery and when deenergized disconnecting the battery from said starter motor, the improvement comprising second relay means in circuit with the first-mentioned relay means and preventing energization of the latter when said second relay means is energized, and permitting energization of said first relay means when said second relay means is deenergized, and switch means adapted to be actuated by the door, said switch means being operable when the ignition switch means is in an "on" position and the door is open for energizing said second relay means, and when the door is closed for causing de-energization of said second relay means.

References Cited in the file of this patent
UNITED STATES PATENTS

| | | |
|---|---|---|
| 2,034,233 | Hasselbaum | Mar. 17, 1936 |
| 2,110,125 | Galloway | Mar. 8, 1938 |
| 2,121,671 | Schwarze | June 21, 1938 |
| 2,182,426 | Courcier | Dec. 5, 1939 |
| 2,360,227 | Hemphill | Oct. 10, 1944 |
| 2,576,017 | Jeffrey et al. | Nov. 20, 1951 |